(12) United States Patent
Nishidate et al.

(10) Patent No.: US 11,386,901 B2
(45) Date of Patent: Jul. 12, 2022

(54) AUDIO CONFIRMATION SYSTEM, AUDIO CONFIRMATION METHOD, AND PROGRAM VIA SPEECH AND TEXT COMPARISON

(71) Applicant: Sony Interactive Entertainment Inc., Tokyo (JP)

(72) Inventors: Masaomi Nishidate, Tokyo (JP); Isamu Terasaka, Tokyo (JP); Norihiro Nagai, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 220 days.

(21) Appl. No.: 16/822,095

(22) Filed: Mar. 18, 2020

(65) Prior Publication Data
US 2020/0312328 A1 Oct. 1, 2020

Related U.S. Application Data

(63) Continuation of application No. PCT/JP2019/014094, filed on Mar. 29, 2019.

(51) Int. Cl.
*G10L 15/22* (2006.01)
*G10L 15/26* (2006.01)
*H04N 5/278* (2006.01)

(52) U.S. Cl.
CPC .............. *G10L 15/26* (2013.01); *G10L 15/22* (2013.01); *H04N 5/278* (2013.01); *G10L 2015/225* (2013.01)

(58) Field of Classification Search
CPC . G10L 15/26; H04N 21/4884; H04N 21/4307
See application file for complete search history.

(56) References Cited

U.S. PATENT DOCUMENTS

| | | | |
|---|---|---|---|
| 7,299,183 B2 * | 11/2007 | Abe | H04N 5/60 704/270 |
| 10,109,278 B2 | 10/2018 | Dzik | |
| 10,423,660 B1 * | 9/2019 | Heo | G06F 40/20 |
| 2005/0060145 A1 | 3/2005 | Abe | |

(Continued)

FOREIGN PATENT DOCUMENTS

| | | |
|---|---|---|
| JP | 2005045503 A | 2/2005 |
| JP | 2010161722 A | 7/2010 |

(Continued)

OTHER PUBLICATIONS

Extended European Search Report for corresponding EP Application No. 201639722.1, 8 pages, dated Sep. 7, 2020.

(Continued)

*Primary Examiner* — Jialong He
(74) *Attorney, Agent, or Firm* — Matthew B. Dernier, Esq.

(57) ABSTRACT

An audio confirmation system includes a voice acquiring section configured to acquire a voice contained in a motion picture; a voice text producing section configured to produce a voice text based on the acquired voice; a determining section configured to determine whether or not the produced voice text and a caption text that is embedded in an image contained in the motion picture correspond to each other; and an outputting section configured to output a result of the determination of the determining section.

6 Claims, 8 Drawing Sheets

(56) References Cited

U.S. PATENT DOCUMENTS

| | | | |
|---|---|---|---|
| 2007/0011012 A1* | 1/2007 | Yurick | G10L 15/26 704/277 |
| 2007/0189724 A1* | 8/2007 | Wan | G06F 40/58 386/244 |
| 2010/0179972 A1 | 7/2010 | Asano | |
| 2011/0134321 A1* | 6/2011 | Berry | G11B 27/322 348/464 |
| 2013/0100347 A1* | 4/2013 | Zinovieva | G11B 27/031 348/468 |
| 2014/0039887 A1 | 2/2014 | Dzik | |
| 2015/0095929 A1* | 4/2015 | Lee | H04N 21/4884 725/18 |
| 2015/0271442 A1* | 9/2015 | Cronin | H04N 21/4394 348/464 |

FOREIGN PATENT DOCUMENTS

| | | | |
|---|---|---|---|
| JP | 2015531915 A | 11/2015 | |
| JP | 2017005442 A | 1/2017 | |
| WO | 2010070519 A1 | 6/2010 | |
| WO | 2014022559 A1 | 2/2014 | |

OTHER PUBLICATIONS

Alberto Sabater: "Automatic Subtitle Synchronization—Machine Learnings", URL:https://machinelearnings.co/automaticsubtitle-synchronization-e188a9275617, 10 pages, Sep. 14, 2017.

* cited by examiner

FIG.4

```
ID : V1
VOICE : Frankly,my dear, I don't give a damn.

START : 05:04
DURATION : 1.5 sec
```

FIG.6

```
ID : T1
TEXT : Frankly,my dear, I don't give a damn.
START : 05:01
DURATION : 2.0 sec
```

FIG. 8

| VOICE ID | STARTING TIME AND DURATION TIME PERIOD OF VOICE | TEXT ID | STARTING TIME AND DURATION TIME PERIOD OF TEXT | DETERMINATION RESULT OF IDENTITY | DETERMINATION RESULT OF DISCREPANCY |
|---|---|---|---|---|---|
| V1 | 5:04 / 1.5 | T1 | 5:01 / 3.0 | OK | OK |
| V2 | 5:10 / 5.0 | T2 | 5:15 / 5.0 | OK | NG |
| V3 | 5:26 / 3.0 | T3 | 5:30 / 3.0 | NG | |

AUDIO CONFIRMATION SYSTEM, AUDIO CONFIRMATION METHOD, AND PROGRAM VIA SPEECH AND TEXT COMPARISON

CROSS REFERENCE TO RELATED APPLICATION

This application is a continuation of International Application No. PCT/JP2019/014094 filed Mar. 29, 2019, the entire disclosure of which is incorporated herein by reference.

BACKGROUND

The present disclosure relates to an audio confirmation system, an audio confirmation method, and a program.

A system is known in which, as in a game, a motion picture including a voice/sound (hereinafter, a voice or a sound is referred to as "audio" or simply as "voice") and a text corresponding to the voice is output as content in accordance with, for example, the situation. In such a system, a voice is output in accordance with conditions such as a set language and a progress status on content, and a text corresponding to the voice is output on a screen.

SUMMARY

When an error occurs in a process of producing content, a failure that a voice and a text do not correspond to each other is caused in an output motion picture. In order to prevent such a failure from being caused, a human tester confirms whether this phenomenon occurs. On the other hand, a very large burden for confirming the correspondence between a voice and a text is imposed on the tester.

The present disclosure has been conducted in view of the above-described circumstances. It is desirable to provide a technique for reducing a burden for confirming whether or not a voice and an image adequately correspond to each other, in motion picture content.

According to an embodiment of the present disclosure, there is provided an audio confirmation system including: a voice acquiring section configured to acquire a voice contained in a motion picture; a voice text producing section configured to produce a voice text based on the acquired voice; a determining section configured to determine whether or not the produced voice text and a caption text that is embedded in an image contained in the motion picture correspond to each other; and an outputting section configured to output a result of the determination of the determining section.

According to another embodiment of the present disclosure, there is provided an audio confirmation method including: acquiring a voice contained in a motion picture; producing a voice text based on the acquired voice; determining whether or not the produced voice text and a caption text that is embedded in an image contained in the motion picture correspond to each other; and outputting a determination result obtained by the determination.

According to further embodiment of the present disclosure, there is provided a program for a computer, including: a voice acquiring section configured to acquire a voice contained in a motion picture; a voice text producing section configured to produce a voice text based on the acquired voice; a determining section configured to determine whether or not the produced voice text and a caption text that is embedded in an image contained in the motion picture correspond to each other; and an outputting section configured to output a result of the determination of the determining section.

According to the present disclosure, in motion picture content, it is possible to reduce a burden for confirming whether or not a voice and an image adequately correspond to each other.

In a mode of the present disclosure, the audio confirmation system may further include a character recognizing section configured to, from the image contained in the motion picture, recognize a caption text that is embedded in the image, based on a character recognition technique.

In another mode of the present disclosure, the determining section may determine whether or not a difference between a timing when a voice in which the voice text is recognized is output, and a timing when a caption text corresponding to the voice text is displayed while being embedded in the image is within an allowable range.

In a further mode of the present disclosure, the voice text producing section may extract a feature amount of the acquired voice, select one of a plurality of voices that are stored in storage section, based on the extracted feature amount, and produce a text that is stored in association with the selected voice, as the voice text.

In a further mode of the present disclosure, the audio confirmation system may further include a motion picture acquiring section configured to acquire the motion picture that is output when a user plays a game.

BRIEF DESCRIPTION OF THE DRAWINGS

FIG. 4 is a view illustrating an example of voice recognition data containing a produced voice text;

FIG. 6 is a view illustrating an example of caption data including a caption text;

FIG. 8 is a view illustrating an example of determination result data that are output by a result outputting section.

DETAILED DESCRIPTION OF THE PREFERRED EMBODIMENT

Figure 1:
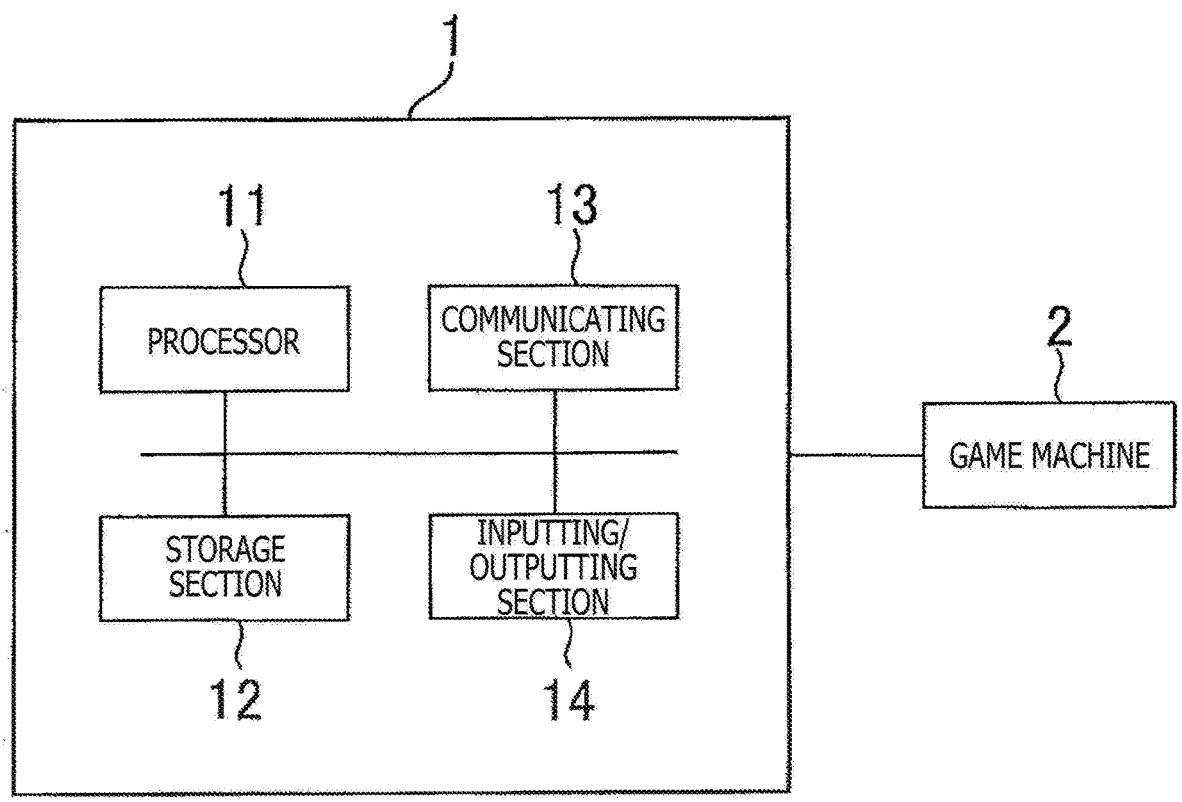
FIG. 1 is a diagram illustrating a hardware configuration of an audio confirmation system of an embodiment of the present disclosure.

Hereinafter, an embodiment of the present disclosure will be described with reference to the drawings. Among described components, those that have the same function are denoted by the identical reference numerals, and their description is omitted.

The present embodiment in which motion picture data including an image and output voice that are output on a display during playing of a game are processed will be described. Although, hereinafter, a case where previously recorded motion picture data are used will be described, image and voice data that are output from a computer executing programs of the game may be processed in real time. In place of motion picture data, a voice of a motion picture, and data indicating the display status of a caption may be acquired.

FIG. 1 is a diagram illustrating an example of the hardware configuration of an audio confirmation system of the embodiment of the present disclosure. The audio confirmation system includes an information processor 1 and a game machine 2. The information processor 1 is a computer such as a personal computer or a server computer, and the game machine is a computer that executes a game program. Although FIG. 1 illustrates only the information processor 1 and the game machine 2, a plurality of computers may be disposed in place of the information processor 1.

The information processor 1 includes a processor 11, a storage section 12, a communicating section 13, and an inputting/outputting section 14.

The processor 11 operates in accordance with programs stored in the storage section 12, to control the communicating section 13, an image processing section, the inputting/outputting section 14, etc. The programs may be provided from a computer-readable storage medium in which the programs are stored, such as a flash memory, or through a network such as the Internet.

The storage section 12 includes memory devices such as a dynamic random access memory (DRAM) and a flash memory, and an external storage device such as a hard disk drive. The storage section 12 stores the above-described programs. The storage section 12 further stores information and calculation results that are supplied from the processor 11, the communicating section 13, and the like.

The communicating section 13 includes integrated circuits, connectors, and antenna that constitute a wired local area network (LAN) or a wireless LAN. The communicating section 13 has a function of communicating with another apparatus through the network. Based on the control by the processor 11, the communicating section 13 supplies information that is received from the other apparatus, to the processor 11 and the storage section 12, and transmits information to the other apparatus.

The inputting/outputting section 14 includes a circuit that acquires an input from hardware for detecting an operation performed by the user, a display control circuit that supplies a signal for displaying an image to the display, and a circuit that outputs a voice and the like. The inputting/outputting section 14 acquires an input signal from an input device such as a keyboard and a controller, and supplies information that is obtained by converting the input signal, to the processor 11 and the storage section 12. The inputting/outputting section 14 may further include a circuit that acquires an image and voice of a motion picture from the game machine 2, and that converts the image and the voice to data.

Figure 2:
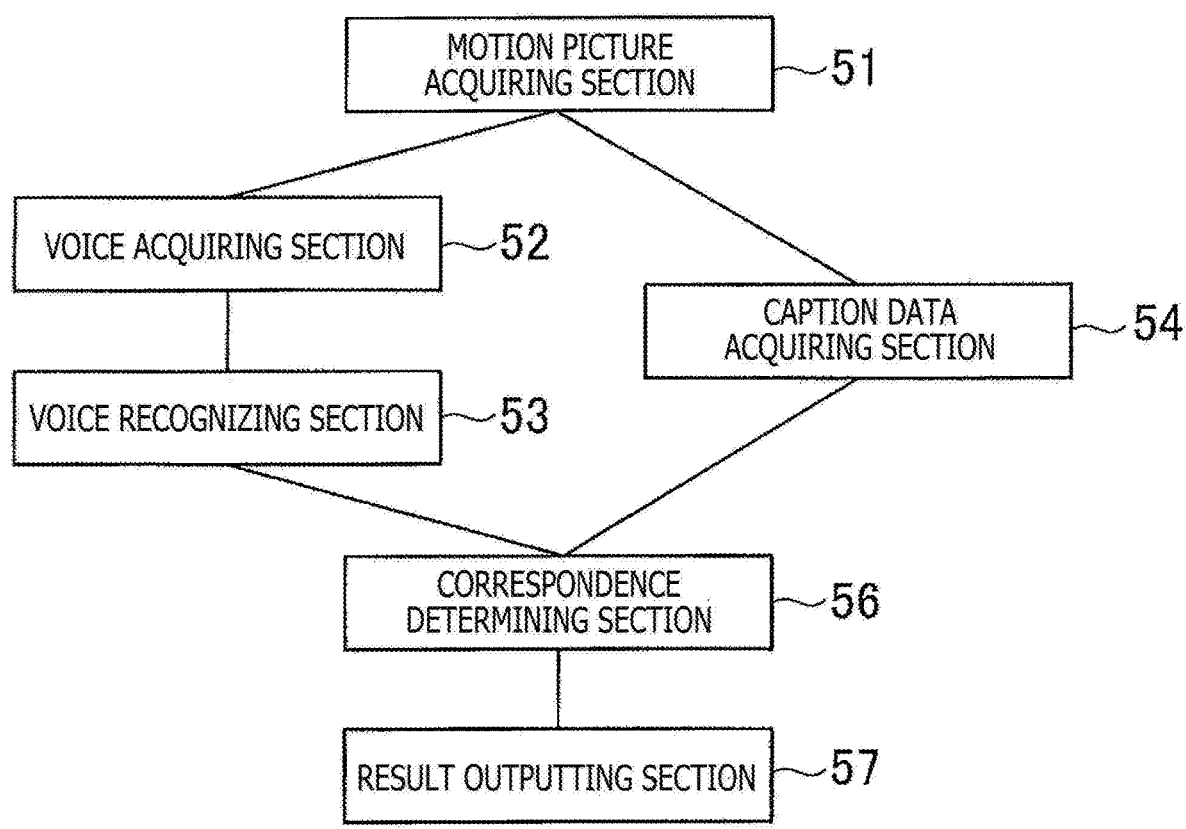
FIG. 2 is a block diagram illustrating functions that are realized by the audio confirmation system.

Hereinafter, functions and processes that are realized by the audio confirmation system will be described. FIG. 2 is a block diagram illustrating functions that are realized by the audio confirmation system. The audio confirmation system functionally includes a motion picture acquiring section 51, a voice acquiring section 52, a voice recognizing section 53, a caption data acquiring section 54, a correspondence determining section 56, and a result outputting section 57. These functions are realized mainly by a process in which the processor 11 executes the programs stored in the storage section 12 to control the communicating section 13 and the image processing section.

The motion picture acquiring section 51 acquires data of a motion picture from the storage section 12 or the other apparatus. The motion picture includes a voice and image that are output during playing of a game. In the present embodiment, when the user plays a game with using the game machine 2, a motion picture is output. More specifically, the motion picture acquiring section 51 may acquire motion picture data that are produced from a voice and image of the output motion picture, from the storage section 12 or the communicating section 13, or may acquire motion picture data through a process in which a motion picture signal that is output from a video output terminal of the game machine 2 is acquired by the inputting/outputting section 14. The motion picture acquiring section 51 may acquire motion picture data in real time, or may acquire motion picture data that are previously stored.

The voice acquiring section 52 acquires a voice contained in a motion picture. The voice recognizing section 53 recognizes the acquired voice, and produces a text (voice text) of the recognized voice.

The caption data acquiring section 54 acquires an image contained in the motion picture, and recognizes a caption text that is embedded in the image, based on a character recognition technique.

The correspondence determining section 56 determines whether or not the produced voice text and the caption text that is embedded in an image contained in the motion picture correspond to each other. The correspondence determining section 56 may further determine whether or not the difference between a timing when the voice from which the voice text is recognized is output, and a timing when the caption text corresponding to the voice text is displayed while being embedded in the image is within a predetermined range.

The result outputting section 57 outputs a result of the determination performed by the correspondence determining section 56.

Figure 3:
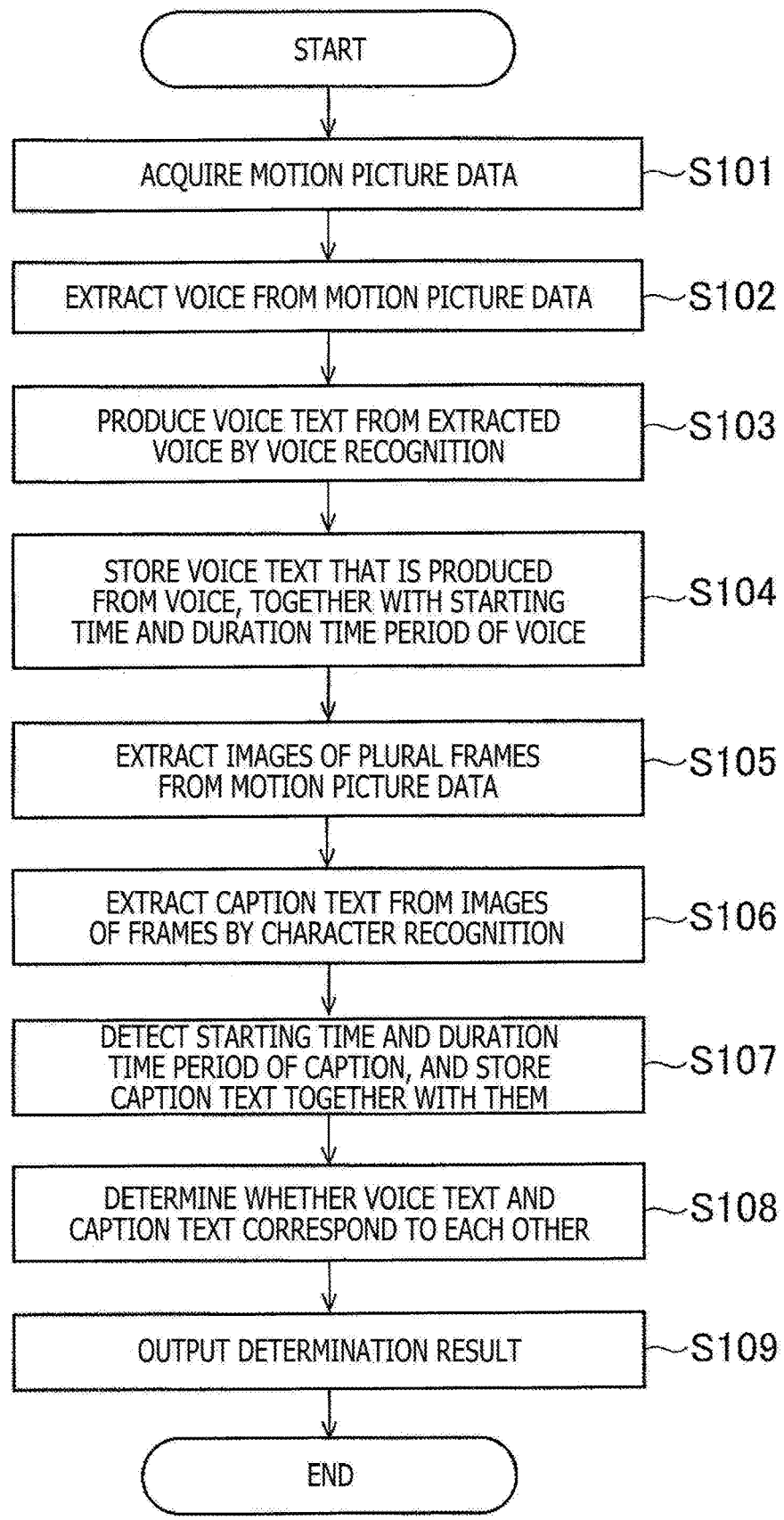
FIG. 3 is a flowchart illustrating an outline of a process of the audio confirmation system.

Next, the process of the audio confirmation system will be described with reference to the drawings. FIG. 3 is a flowchart illustrating an outline of the process of the audio confirmation system.

Initially, the motion picture acquiring section 51 acquires data (motion picture data) of the motion picture stored in the storage section 12 (step S101).

Next, the voice acquiring section 52 acquires data of a voice from the motion picture data (step S102). Then, the voice recognizing section 53 acquires a voice text from the acquired voice data, by the voice recognition (step S103). Here, the voice recognizing section 53 causes the starting time and duration time period of a voice that correspond to the voice text in the motion picture, to be stored together with the voice text in the storage section 12 (step S104). The starting time and the duration time period indicate the starting and ending timings of the voice, respectively.

FIG. 4 is a view illustrating an example of voice recognition data containing the produced voice text. The voice recognition data illustrated in FIG. 4 are stored in the storage section 12 in step S104. The data contain items of ID, VOICE, START, and DURATION. The item of ID indicates the identification information allocated to the voice text. The item of VOICE indicates the voice text. The item of START indicates the starting time of an output of the voice corresponding to the voice text. The item of DURATION indicates the duration time period of the voice. The starting time and the duration time period are the starting time and duration time period of the motion picture, respectively.

The caption data acquiring section 54 extracts respective images of a plurality of frames constituting the motion picture, from the motion picture data (step S105). Then, the caption data acquiring section 54 extracts a caption text from each of the images of the plurality of frames by a character recognition technique (step S106). The caption data acquiring section 54 compares changes of a frame from which the caption text is extracted, with respect to previous and subsequent frames, with one another, thereby detecting the starting time and duration time period of the display of the caption text, and causes the caption text to be stored together with the starting time and the duration time period in the storage section 12 (step S107).

Figure 5:
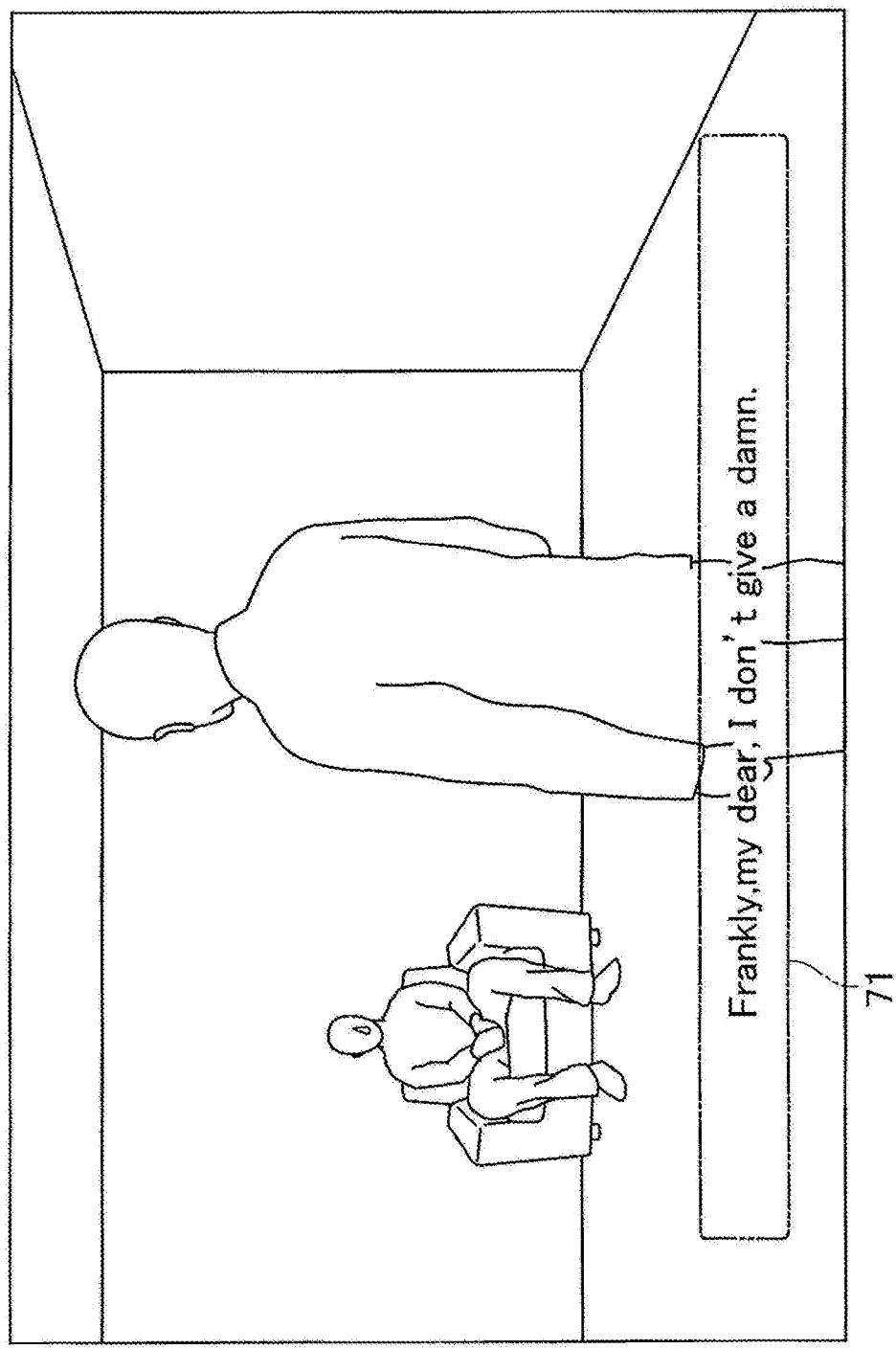
FIG. 5 is a view illustrating an example of an image including a caption.

FIG. 5 is a view illustrating an example of an image containing a caption 71. Usually, the caption 71 is displayed in a predetermined region that elongates along one end of an image region. Therefore, the caption data acquiring section 54 extracts a region where the caption 71 is displayed, from the image of each of the frames, and applies a character recognition technique to the extracted regions, thereby producing a caption text.

FIG. 6 is a view illustrating an example of caption data including a caption text. In step S107, the caption data illustrated in FIG. 6 are stored in the storage section 12. The data contain items of ID, TEXT, START, and DURATION. The item of ID indicates the identification information allocated to the caption text. The item of TEXT indicates the caption text. The item of START indicates the starting time of a display of the caption text. The item of DURATION indicates the duration time period of the display. The starting time and the duration time period are the starting time and duration time period of the motion picture, respectively.

When the voice text and the caption text are produced, the correspondence determining section 56 determines whether the voice text and the caption text correspond to each other (step S108). Then, the result outputting section 57 outputs a result of the determination performed in step S108 (step S109).

In the case where motion picture data are input in real time, for example, the processes of steps S101 to S108 may be repeatedly performed. Alternatively, the processes of steps S102 to S104 and the processes of steps S105 to S107 may be performed in parallel.

Figure 7:
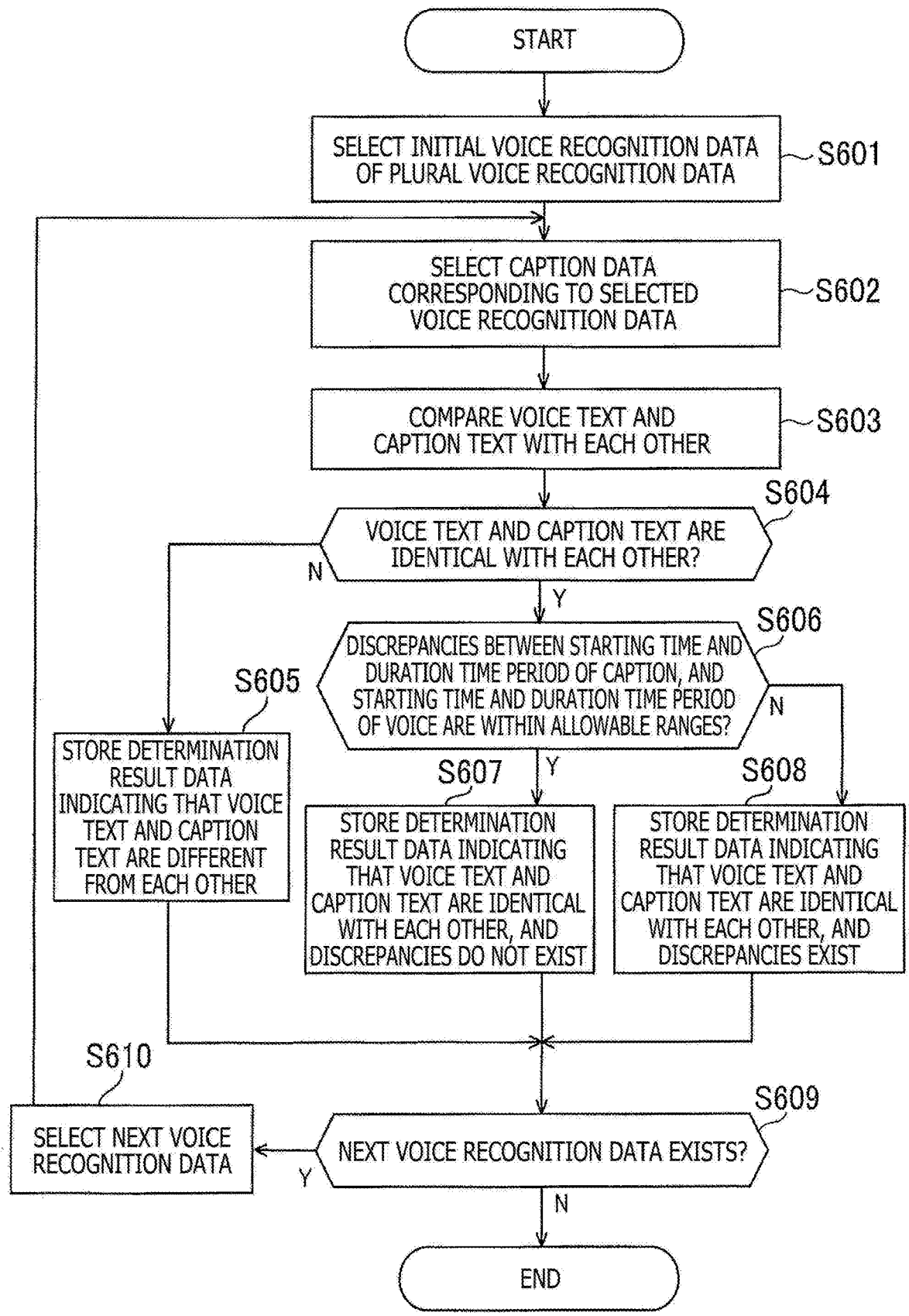
FIG. 7 is a flowchart illustrating an example of a process of a correspondence determining section.

Next, the process that is performed in step S108 by the correspondence determining section 56 will be described in more detail. FIG. 7 is a flowchart illustrating an example of the process performed by the correspondence determining section 56. It is assumed that, before the process, the voice recognizing section 53 and the caption data acquiring section 54 cause a plurality of voice recognition data and plurality of caption data with respect to a certain motion picture to be stored in the storage section 12.

At first, the correspondence determining section 56 selects the initial voice recognition data of the plurality of voice recognition data stored in the storage section 12 (step S601). From the plurality of caption data, the correspondence determining section 56 selects caption data corresponding to the selected voice recognition data (step S602).

In step S602, the correspondence determining section 56 may select caption data based on the starting time of the selected voice recognition data, and the starting times of the plurality of caption data. In the case where the difference between the starting time of certain caption data and the starting time of the voice recognition data is within a predetermined range, the correspondence determining section 56 may select the certain caption data. The predetermined range may be a range where the absolute value of the difference of the starting time with respect to the selected voice recognition data is smaller than a predetermined candidate threshold. In the case where there exist caption data in which the difference (first difference) of the starting time with respect to the selected voice recognition data is smallest, and the first difference is smaller than the difference (second difference) of the starting time with respect to other selected voice recognition data, the correspondence determining section 56 may select the caption data in which the first difference is calculated. The correspondence determining section 56 may select caption data from caption data that are not determined to correspond to other voice recognition data which have been processed, or may select caption data that are produced from an image that is temporally later than caption data in which correspondence is determined in a previous process. Although not illustrated, in the case where corresponding caption data do not exist, processes of the voice recognition data are skipped.

When the corresponding caption data are selected, the correspondence determining section 56 compares the voice text included in the voice recognition data, and the caption text contained in the caption data with each other (step S603), and determines whether or not the voice text and the caption text are identical with each other (step S604). Here, if the voice text and the caption text are identical with each other except punctuation marks, the correspondence determining section 56 may determine that the both texts are identical with each other, or, if the number of different characters is smaller than a predetermined number, may determine that the texts are identical with each other.

If it is determined that the voice text and the caption text are not identical with each other (N in step S604), determination result data indicating that the voice text and the caption text are different from each other are stored in the storage section 12 (step S605). If it is determined that the voice text and the caption text are identical with each other (Y in step S604), the correspondence determining section 56 determines whether or not the discrepancies between the starting time and duration time period of the voice recognition data, and those of the caption data are within respective predetermined allowable ranges (step S606).

In step S606, for example, the correspondence determining section 56 may determine whether or not the difference between the starting times is within the predetermined allowable range, or determine whether or not the difference between the starting times and the difference between the duration time periods are within the respective allowable ranges. Each of the allowable ranges may be a range where the absolute value of the difference is simply smaller than a determination threshold (the determination threshold is smaller than a candidate threshold), or may be determined to $-A \leq$(difference between starting times)$\leq B$ (A and B are positive numbers, and $A \neq B$).

If the discrepancies are within the predetermined allowable ranges (Y in step S606), the correspondence determining section 56 causes determination result data indicating that the voice text and the caption text are identical with each other, and discrepancies do not exist in the starting times and the like (the discrepancies are within the allowable ranges), to be stored in the storage section 12 (step S607).

On the other hand, if the discrepancies are not within the predetermined allowable ranges (N in step S606), the correspondence determining section 56 causes determination result data indicating that the voice text and the caption text are identical with each other, and discrepancies exist in the starting times and the like (the discrepancies are not within the allowable ranges), to be stored in the storage section 12 (step S608).

FIG. 8 is a view illustrating an example of determination result data that are output by a result outputting section 57. FIG. 8 illustrates an example of a list of a plurality of determination result data that are stored in the storage section 12. In the example, the result outputting section 57 outputs determination result data stored in the storage section 12. In the example of FIG. 8, the determination result data include information (VOICE ID) identifying voice recognition data, information (TEXT ID) identifying candidate caption data, and information (DETERMINATION RESULT) indicating the determination result of correspondence between the voice recognition data and the caption data. In the example of FIG. 8, the column of DETERMINATION RESULT OF IDENTITY indicates whether or not a voice text and a caption text are identical with each other, by a term of "OK" or "NG," and the column of DETERMINATION RESULT OF DISCREPANCY indicates whether or not the discrepancies between the starting time and duration time period of a voice, and those of a caption are within respective allowable ranges, by a term of "OK" or "NG." The correspondence determining section 56 may cause information of voice recognition data with respect to which the corresponding caption data are not selected, and information of caption data that are not selected for voice recognition data, to be stored as determination result data, and the result outputting section 57 may output these sets of information. If the next voice recognition data exist (Y in step S609), then, the correspondence determining section 56 selects the next voice recognition data (step S610), and repeats the processes starting from step S602. On the other hand, if the next voice recognition data do not exist (N in step S609), the process of the correspondence determining section 56 is ended.

In place of the process in which voice recognition data are sequentially processed, the correspondence determining section 56 may sequentially process caption data. In this case, processes in which the caption data and the voice recognition data are replaced with each other are executed in steps S601, S602, S609, and S610. In steps S602 and S605, candidate caption data are selected by using the difference between the starting times, and the correspondence is determined. Alternatively, corresponding caption data may be selected based on whether or not the output time period of voice recognition data that is obtained from the starting time and the duration time period, and that of caption data overlap with each other.

As a result of these processes, it is possible to easily confirm whether, in a motion picture such as a playing motion picture of a game, a voice and a caption correspond to each other, and a burden for finding a failure in production can be reduced.

In the case where a database in which a plurality of voice data to be reproduced, and a plurality of caption text data including a text of dialogues are previously associated with each other by software control is disposed in the game machine 2, caption text data that are associated by using the database with a voice extracted from motion picture data may be used as a voice text in place of production of a voice text by using a known voice recognition technique.

More specifically, the voice recognizing section 53 extracts the feature amount of a voice extracted from motion picture data. Then, the voice recognizing section 53 selects voice data having a feature amount that is closest to the extracted feature amount, from the plurality of voice data stored in the database. The voice recognizing section 53 acquires, as voice text data, caption data that are stored in the database in association with the selected voice data. With respect to each of the plurality of voice data, the voice feature amount may be previously calculated, and the feature amount may be stored in association with the voice data in the database.

Even when a voice is recorded in a state where the accuracy of a process in which a character string is produced by voice recognition is not sufficiently high, above-described acquisition of a voice text enables the identity of a voice and a caption to be confirmed. Even in the case where, with respect to a voice of a certain language (for example, voice of English language), a caption of a different language (for example, caption of Japanese language) is displayed, when a voice of English language and a caption of Japanese language are previously associated with each other, it is possible to confirm the identity. Therefore, for example, a failure in correspondence between voice data and caption text data can be detected more surely.

It should be understood by those skilled in the art that various modifications, combinations, sub-combinations and alterations may occur depending on design requirements and other factors insofar as they are within the scope of the appended claims or the equivalents thereof.

What is claimed is:

1. An audio confirmation system comprising:
a voice acquiring section configured to acquire a voice contained in a motion picture;
a voice text producing section configured to produce a voice text based on the acquired voice;
a determining section configured to determine whether or not the produced voice text and a caption text that is embedded in an image contained in the motion picture correspond to each other;
an outputting section configured to output a result of the determination of the determining section; and
a database containing a plurality of respective segments of voice data and a plurality of respective segments of caption text data, each respective segment of caption text data being associated with, and being determined to correspond with, a respective one of the plurality of respective segments of voice data based on the determining section,
wherein the voice text producing section is configured to produce voice text of the acquired voice by:
(i) determining a feature amount of the acquired voice by extracting voice features from the acquired voice,
(ii) comparing the feature amount of the acquired voice with one or more feature amounts obtained from the plurality of respective segments of voice data in the database,
(iii) selecting one of the respective segments of voice data in the database based on a closeness of a match between the feature amount of the acquired voice and the feature amount of the selected one of the respective segments of voice data obtained from the database, and
(iv) using the associated caption text data of the selected one of the respective segments of voice data from the database as the produced voice text of the acquired voice.

2. The audio confirmation system according to claim 1, further comprising: a character recognizing section configured to, from the image contained in the motion picture, recognize a caption text that is embedded in the image, based on a character recognition technique.

3. The audio confirmation system according to claim 2, wherein the determining section determines whether or not a difference between a timing when a voice in which the voice text is recognized is output, and a timing when a caption text corresponding to the voice text is displayed while being embedded in the image is within an allowable range.

4. The audio confirmation system according to claim 1, further comprising: a motion picture acquiring section configured to acquire the motion picture that is output when a user plays a game.

5. An audio confirmation method comprising:

acquiring a voice contained in a motion picture;

producing a voice text based on the acquired voice;

determining whether or not the produced voice text and a caption text that is embedded in an image contained in the motion picture correspond to each other;

outputting a determination result obtained by the determination; and providing a database containing a plurality of respective segments of voice data and a plurality of respective segments of caption text data, each respective segment of caption text data being associated with, and being determined to correspond with, a respective one of the plurality of respective segments of voice data based on the determining section, wherein the producing voice text includes producing voice text of the acquired voice by:

(i) determining a feature amount of the acquired voice by extracting voice features from the acquired voice, (ii) comparing the feature amount of the acquired voice with one or more feature amounts obtained from the plurality of respective segments of voice data in the database, (iii) selecting one of the respective segments of voice data in the database based on a closeness of a match between the feature amount of the acquired voice and the feature amount of the selected one of the respective segments of voice data obtained from the database, and (iv) using the associated caption text data of the selected one of the respective segments of voice data from the database as the produced voice text of the acquired voice.

6. A non-transitory, computer readable storage medium containing a computer program, which when executed by a computer, causes the computer to carry out actions, comprising:

acquiring a voice contained in a motion picture;

producing voice text based on the acquired voice;

determining whether or not the produced voice text and a caption text that is embedded in an image contained in the motion picture correspond to each other;

outputting a determination result obtained by the determination; and providing a database containing a plurality of respective segments of voice data and a plurality of respective segments of caption text data, each respective segment of caption text data being associated with, and being determined to correspond with, a respective one of the plurality of respective segments of voice data based on the determining section, wherein the producing voice text includes producing voice text of the acquired voice by:

(i) determining a feature amount of the acquired voice by extracting voice features from the acquired voice, (ii) comparing the feature amount of the acquired voice with one or more feature amounts obtained from the plurality of respective segments of voice data in the database, (iii) selecting one of the respective segments of voice data in the database based on a closeness of a match between the feature amount of the acquired voice and the feature amount of the selected one of the respective segments of voice data obtained from the database, and (iv) using the associated caption text data of the selected one of the respective segments of voice data from the database as the produced voice text of the acquired voice.

\* \* \* \* \*